United States Patent [19]

Elbl-Weiser et al.

[11] Patent Number: 5,374,740

[45] Date of Patent: Dec. 20, 1994

[54] RECRYSTALLIZABLE POLYIMIDES

[75] Inventors: Karin Elbl-Weiser, Schriesheim; Juergen Koch, Neuhofen, both of Germany

[73] Assignee: BASF Aktiengesellschaft, Ludwigshafen, Germany

[21] Appl. No.: 113,093

[22] Filed: Aug. 30, 1993

[30] Foreign Application Priority Data

Sep. 2, 1992 [DE] Germany ............... 4229180

[51] Int. Cl.$^5$ ..................... C07D 403/14
[52] U.S. Cl. ..................... 548/461; 528/125
[58] Field of Search ............ 548/461; 528/125

[56] References Cited

U.S. PATENT DOCUMENTS 4,393,162 7/1983 Paschke et al. ............ 528/125
5,072,046 12/1991 Burogyne, Jr. et al. ........ 564/328

FOREIGN PATENT DOCUMENTS 071749 11/1985 European Pat. Off. .
122060 11/1990 European Pat. Off. .

OTHER PUBLICATIONS

Hergenrohther, P. M. "Recent Advances in High Temperature Polymers", *Polymer Journal*, 19, pp. 73–83, (1987).

*Primary Examiner*—Patricia L. Morris
*Assistant Examiner*—Jacqueline Haley
*Attorney, Agent, or Firm*—Keil & Weinkauf

[57] ABSTRACT

Polyimides can be obtained by reacting a dianhydride component comprising 3,4,3',4'-bisphenyltetracarboxylic dianhydride, oxydiphthalic dianhydride and in addition further aromatic dianhydrides, and a diamine component comprising diamines of the formula

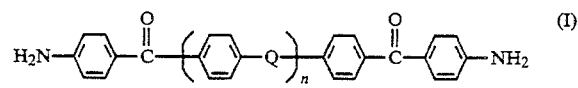

and in addition further aromatic diamines.

6 Claims, No Drawings

RECRYSTALLIZABLE POLYIMIDES

The present invention relates to polyimides that are obtainable by reacting
A) a dianhydride component consisting of
  a₁) 65 to 98 mol % of 3,4,3',4'-biphenyltetracarboxylic dianhydride of the structure

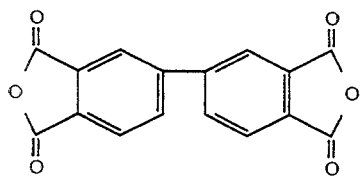

and
  a₂) 2 to 35 mol % of oxydiphthalic dianhydride of the structure

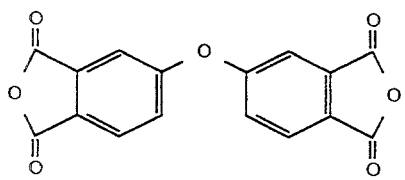

and in addition
  a₃) 0 to 30 mol % of further aromatic dianhydrides different from (a₁) and (a₂), with
B) a diamine component consisting of
  b₁) 65 to 100 mol % of diamines of the formula

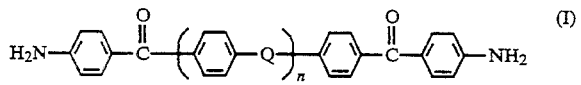

(I)

where n may be 1 or 2 and Q is —O—, —S—, —SO₂—, —C(CH₃)₂—, —C(CF₃)₂— or —CH₂— and in addition
  b₂) 0 to 35 mol % of further aromatic diamines different from (b₁).

The present invention also relates to the use of these polyimides to produce moldings, fibers or films and also adhesives.

Since it is known that partly crystalline polymers in general have better mechanical properties than their amorphous analogs and generally also exhibit a higher stability to harmful environmental influences, partly crystalline polyimides have been prepared. If however these polyimides are melted, most of the known partly crystalline polyimides remain amorphous even after cooling. Nor can the partial crystallinity be regenerated thereafter by thermal treatment [Hergenrother: Polymer J. 19, 73–83 (1987)].

Individual recrystallizable polyimides are known from EP-B1-122 060 (see page 14, Examples 8c and 8h). Further recrystallizable polyimides are described in the non-prior-published German Patent Application P 41 16 366.4.

Polyimides based on bisaminophenyl ketones are known from EP-B1-71749 and also from U.S. Pat. No. 5,072,046.

It is an object of the present invention to provide polyimides, based on bisaminophenyl ketones, that are recrystallizable and preferably have a melting point below 400° C.

We have found that this object is achieved by the polyimides described at the beginning.

The polyimides according to the invention can be prepared by reacting a dianhydride component (A) with a diamine component (B).

The dianhydride component is a mixture of 3,4,3',4'-biphenyltetracarboxylic dianhydride (a₁) of the structure

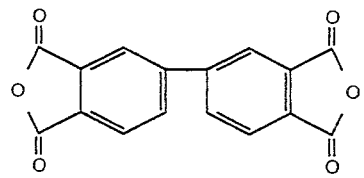

and 4,4'-oxydiphthalic anhydride (a₂) of the structure

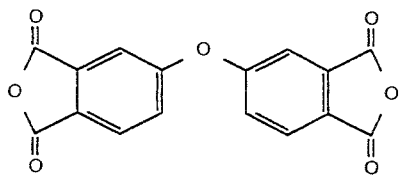

In addition the dianhydride component can contain further aromatic dianhydrides (a₃) that are different from (a₁) and (a₂). The dianhydride component contains from 65 to 98 mol %, preferably 75 to 98 mol %, in particular 80 to 94 mol %, of the dianhydride (a₁), and from 2 to 35 mol %, preferably 2 to 25 mol %, and in particular 4 to 18 mol %, of the dianhydride (a₂).

The proportion of the dianhydrides (a₃) may be up to 35 mol %. Preferably from 0 to 15 mol %, in particular 2 to 10 mol %, of these dianhydrides are used.

Suitable dianhydrides (a₃) are preferably those having the structure

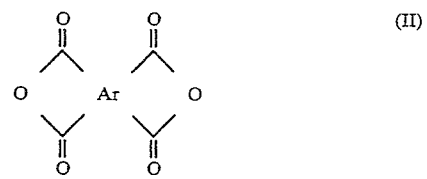

(II)

where Ar is

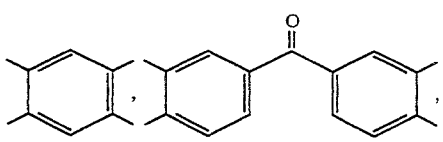

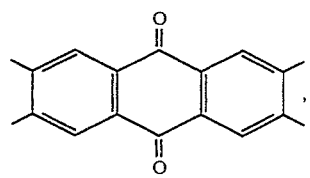

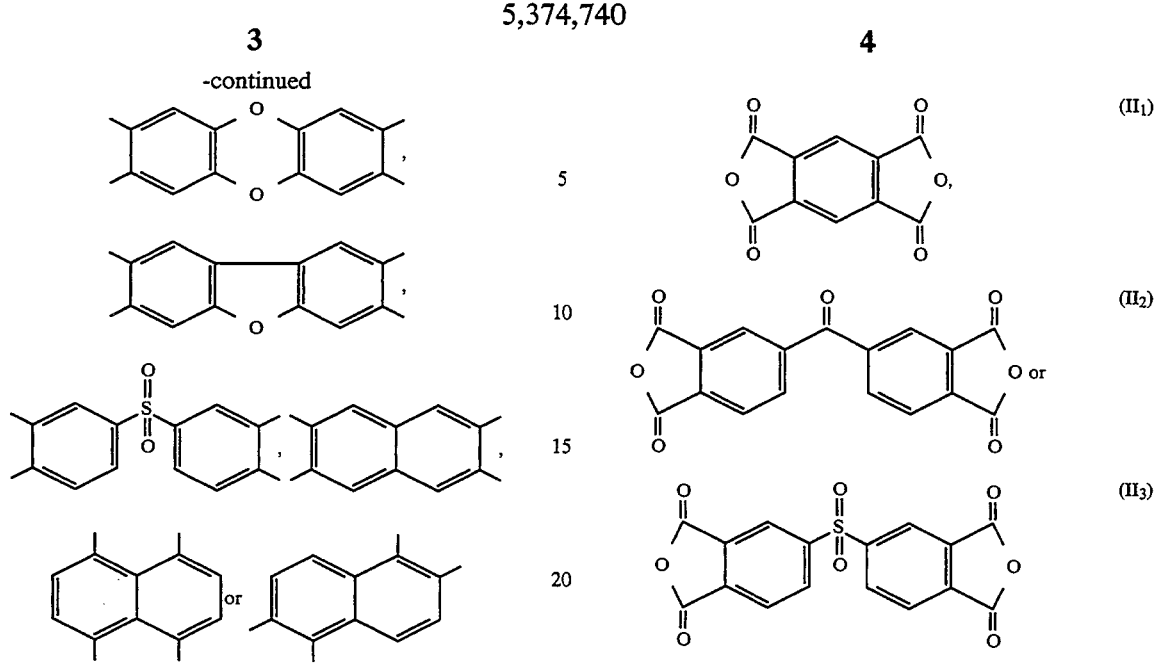

In addition there may also be used compounds (II) in which Ar is

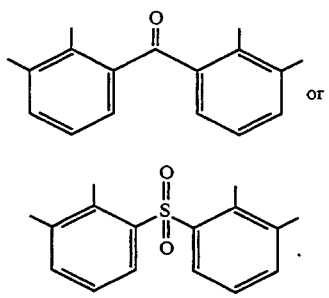

Particularly preferred dianhydrides (a₃) are

The diamine component (B) contains from 65 to 100 mol %, preferably 80 to 100 mol %, and in particular 90 to 98 mol %, of diamines (b₁). The diamine component may however contain further aromatic diamines (b₂) different from (b₁). The proportion of diamines (b₂) in (B) may be from 0 to 35 mol %, preferably from 0 to 20 mol %, and in particular from 2 to 10 mol %.

As diamines (b₁) bisaminophenyl ketones of the formula

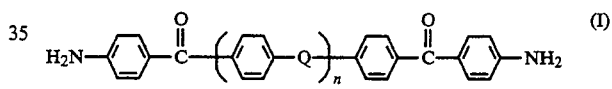

are used, where
n may be 1 or 2, and
Q is —O—, —S—, —SO₂—, —C(CH₃)₂—, —C(CF₃)₂— or —CH₂—. Examples of these diamines are:

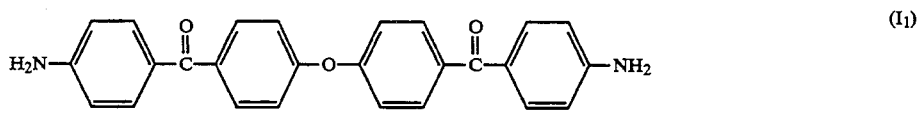

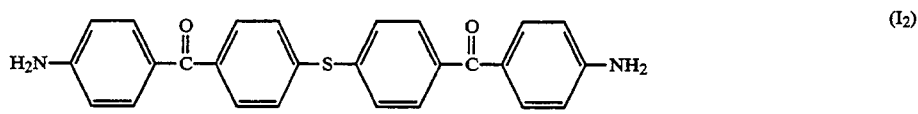

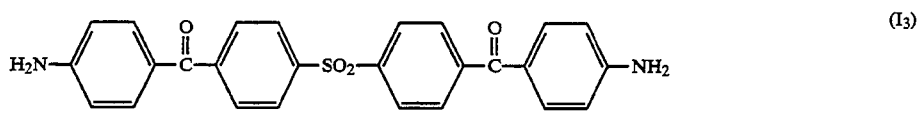

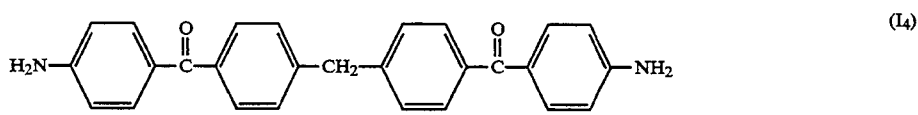

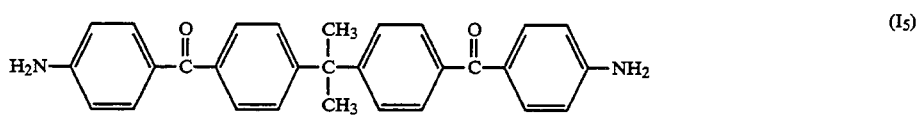

-continued

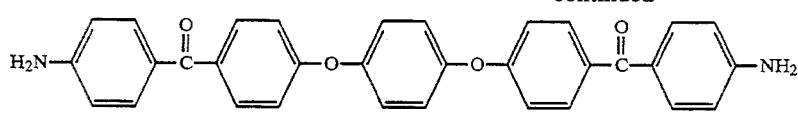 (I₆)

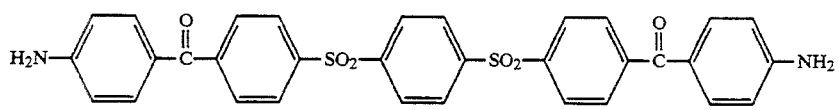 (I₇)

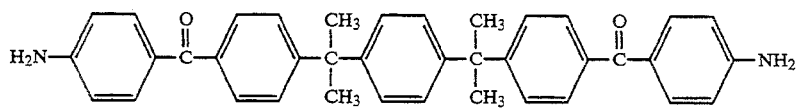 (I₈)

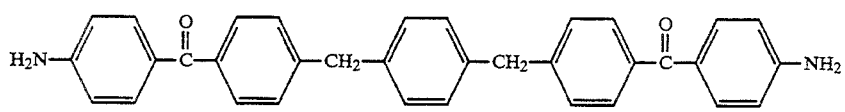 (I₉)

Particularly preferred diamines are those of the structures I₁, I₂ and I₃. Diamines of the structure (I₁) are particularly preferably used.

In general the diamines (b₂) have the formula

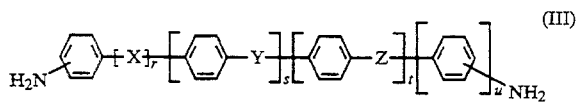 (III)

where
r, s, t and u are, independently of one another, 0 or 1, and
X, Y and Z are, independently of one another, —O—, —CO—, —S—, —SO₂—, or a direct bond.

Examples of such diamines are

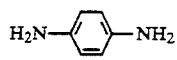 (III₁)

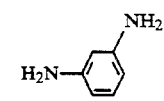 (III₂)

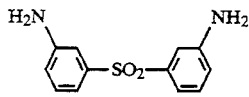 (III₃)

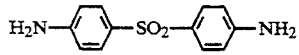 (III₄)

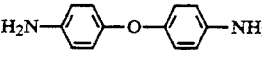 (III₅)

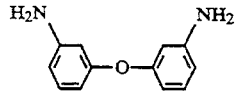 (III₆)

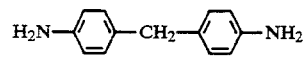 (III₇)

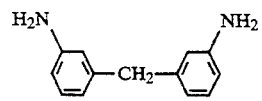 (III₈)

-continued

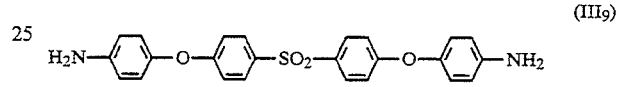 (III₉)

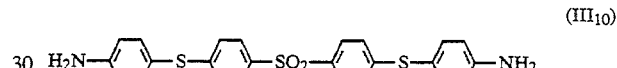 (III₁₀)

 (III₁₁)

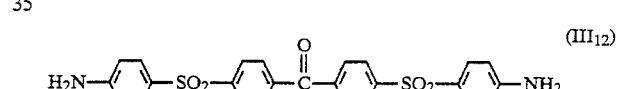 (III₁₂)

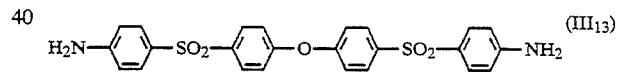 (III₁₃)

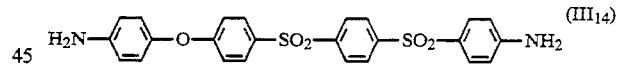 (III₁₄)

The diamines (III₁) to (III₈) are preferably used.

The polyimides according to the invention generally have reduced viscosities in the range from 20 to 200 ml/g. The reduced viscosities are preferably in the range from 30 to 130 ml/g. The reduced viscosities are measured in concentrated sulfuric acid at a concentration of 0.5 g/100 ml. The melting points and glass transition temperatures of polyimides according to the invention are determined by means of DSC, for which purpose the polyimides are heated up at a heating rate of 20° C./min. The melting points are generally in the range from 250 to 400, in particular from 300° to 400° C. After the second or further heating(s) the melting points are generally in the range from 240° to 400° C., in particular from 250 to 390° C. The glass transition temperatures are generally in the range from 180° to 250° C., in particular from 200 to 250° C.

In order to achieve good mechanical properties it is advantageous if the number average molecular weight $\overline{M}_n$ of the polyimides according to the invention is at least 10,000 g/mol. For many application purposes $\overline{M}_n$ may be in the range from 15,000 to 20,000 g/mol; molecular weights $\overline{M}_n$ of more than 30,000 g/mol are generally not necessary.

The polyimides are prepared according to the invention by reacting the dianhydride component (A) with the diamine component (B). During the course of this reaction the anhydride rings are presumably first of all converted into the corresponding amide-carboxylic acid groups. This polyamide-carboxylic acid prepolymer then cyclizes with the elimination of water to form the corresponding polyimide, as illustrated diagrammatically hereinafter:

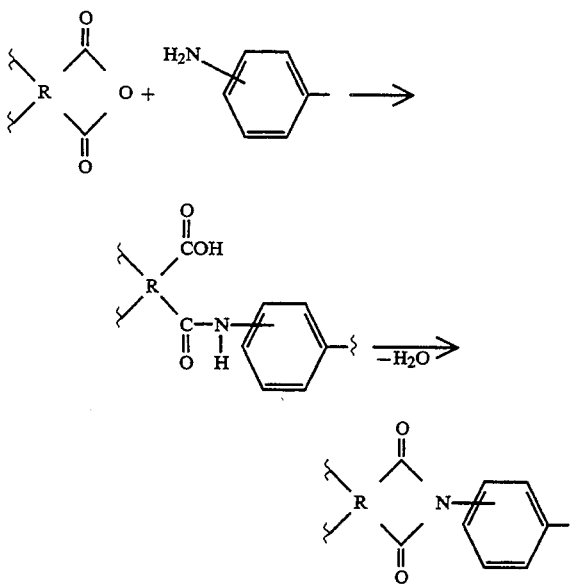

Monofunctional compounds may be added at the start of or during the reaction, and also after the desired molecular weight has been reached. The molecular weights of the polyimides and the flow properties and also the stability of their melts can be controlled in this way. Suitable monofunctional compounds include aromatic anhydrides such as phthalic anhydride and aromatic amines, for example aniline.

The elimination of water is carried out in a solvent or solvent mixture. Preferred solvents that are used are dipolar aprotic solvents such as N,N-dimethylformamide, N,N-dimethylacetamide, N-methylpyrrolidone, dimethyl sulfoxide, diphenyl sulfone, sulfolane, γ-butyrolactone and N-methylcaprolactam. N-Methylpyrrolidone is particularly preferred. Often it is expedient to use in addition one or more cosolvents that form an azeotropic mixture with water, enabling the water of reaction to be removed by azeotropic distillation. One of the suitable cosolvents is for example toluene.

Depending on the reactivity of the diamine component, the elimination of water is carried out at elevated temperature, preferably with the co-use of a cosolvent, or at a relatively low temperature in the presence of a catalyst. A measure of the reactivity of the diamine component is its basicity constant, expressed as the pKa value (see e.g. Bessonov et al.: "Polyimides—Thermally Stable Polymers", Consultants Bureau, New York 1987, 20 ff). In general the catalytic process is preferred for diamines having a pKa value greater than 4.5, otherwise the purely thermal process is preferred.

The elimination of water in the absence of a catalyst starts in most cases at 20° C. and generally proceeds at a substantial rate only at 80° C. and above. Temperatures above 190° C. are generally not necessary if a cosolvent is used as well. In the presence of a catalyst the polyamide-carboxylic acid prepolymer generally already cyclizes below 100° C., and in most cases even at temperatures below 70° C., at a fairly high rate.

Catalysts that are used are generally mixtures of tertiary amines and anhydrides of lower fatty acids. Suitable tertiary amines include aliphatic amines such as tributylamine or triisopropylamine, or aromatic amines such as pyridine, lutidine, quinoline or isoquinoline. Examples of suitable anhydrides include acetic anhydride, hexanoic anhydride, caprylic anhydride and lauric anhydride. Acetic anhydride is preferably used.

The polyimides according to the invention are notable for their good solubility in the aforementioned solvents. In general they are completely soluble in the latter even in concentrations of more than 10% by weight. They generally have reduced viscosities from 20 ml/g, preferably from 30 ml/g, measured in N-methylpyrrolidone at a concentration of 0.5 g/100 ml. The polyimides according to the invention generally do not have reduced viscosities above the value of 200 ml/g, measured in N-methylpyrrolidone at a concentration of 0.5 g/100 ml. Preference is given to polyimides having reduced viscosities of 130 ml/g or less, measured in N-methylpyrrolidone at a concentration of 0.5 g/100 ml.

Conventional additives may be added to the polyimides according to the invention in amounts of up to 50% by weight, preferably 5 to 30% by weight, based on the mixture. Such additives include fibrous or particulate fillers or reinforcing agents such as carbon or glass fibers, glass spheres and calcium silicates such as wollastonite and kaolin.

Further additives that the polyimides according to the invention may contain are for example stabilizers, flow improvers and dyes. These may generally be contained in amounts of from 0.01 to 10% by weight in the polyimide sulfones according to the invention.

The polyimides according to the invention may be thermoplastically processed by methods known per se into moldings, fibers or sheetlike structures. It is preferred to process the polyimides from the melt. It is however, for example, also possible to disperse the polyimides in a dispersing medium prior to processing. Processing may be effected for example by press molding, extrusion, injection molding or thermoforming. A melt or dispersion may, however, also be applied to reinforcing fibers or mats and the resultant semi-finished product may then be shaped, if necessary after removing the dispersing medium.

The polyimides according to the invention may be used as structural adhesives, the crystallinity of the polyimides conferring a high strength and also a high solvent resistance on the bonded joints.

Finally, the polyimides according to the invention can also be used for the preparation of thermoplastic molding materials by mixing with other known high temperature-resistant polymers, for example polyaryl ethers. In order to be able to utilize the aforedescribed special advantages of the polyimides according to the invention, resulting from their partial crystallinity, such mixtures contain the polyimides according to the invention preferably in a mixing ratio that enables the partly crystalline character to be retained in the polymer mixtures.

EXAMPLES

The reduced viscosities $\eta_{red}$, melting points $T_m$ and glass transition temperatures $T_g$ were determined as described above.

EXAMPLES 1 to 4

The reaction was carried out under nitrogen as shielding gas. N-methylpyrrolidone (NMP) was added to the reaction vessel, followed by the addition of 4,4-bis(4-aminobenzoyl)diphenyl ether ($I_1$) (BPDE). After the diamine (BPDE) had completely dissolved, 3,4,3',4'-biphenyltetracarboxylic dianhydride ($a_1$) (BPDA) and 4,4'-oxydiphthalic anhydride ($a_2$) (ODPA) and phthalic anhydride (PA) and 4-dimethylaminopyridine were metered into the mixture, cooled with iced water.

The reaction mixture was then heated to room temperature and stirred for four hours at this temperature. The reaction mixture was then diluted with further NMP, followed by the addition of mesitylene.

The reaction mixture was refluxed while stirring and the water of reaction formed was distilled off. The mesitylene was then distilled off.

After the reaction mixture had cooled it was poured into methanol, and the solid product was suction filtered and washed with methanol. The product was dried at 150° C. under reduced pressure.

COMPARATIVE EXAMPLE 1

The reaction was carried out under nitrogen as shielding gas. 100 ml of N-methylpyrrolidone (NMP) were placed in the reaction vessel, followed by the addition of 20.83 g (51 mmol) of 4,4'-bis(3-aminobenzoyl)diphenyl ether. After the diamine had completely dissolved, 11.77 g (40 mmol) of 3,4,3',4'-biphenyltetracarboxylic dianhydride ($a_1$) and 0.296 g (2 mmol) of phthalic anhydride were metered into the mixture, cooled with iced water, the rest of the procedure being as described in Example 1.

The yield of polymer was 32.8 g (98.5% of theory).

The reduced viscosity was measured and found to be 76 ml/g.

The DSC measurement showed a melting point of 276° C. on the first heating. After the second heating only a glass transition at 239° C. could be observed, i.e. the polyimide was amorphous.

COMPARATIVE EXAMPLE 2

The reaction was performed under nitrogen as shielding gas. 100 ml of N-methylpyrrolidone (NMP) were placed in the reaction vessel followed by the addition of 20.83 g (51 mmol) of 4,4'-bis(4-aminobenzoyl)diphenyl ether ($I_1$). After the diamine had completely dissolved, 11.77 g (40 mmol) of 3,4,3',4'-benzophenone dianhydride ($a_2$) and 0,296 g (2 mmol) of phthalic anhydride were metered into the mixture, cooled with iced water, the rest of the procedures being as described in Example 1.

The yield of polymer was 32.9 g (94.8% of theory). The reduced viscosity was measured and found to be 34 ml/g.

The DSC measurement showed two melting points of 388° and 400° C. during the first heating. On the second heating a glass transition could be observed at 240° C., but no melting point, i.e. the polyimide was amorphous.

We claim:

1. A polyimide that is obtained by reacting
A) a dianhydride component consisting essentially of
   $a_1$) 65 to 98 mol % of 3,4,3',4'-biphenyltetra-carboxylic dianhydride of the structure

|  | EXAMPLE | | | | | | | |
|---|---|---|---|---|---|---|---|---|
|  |  | 1 | | 2 | | 3 | | 4 |
| Components | | | | | | | | |
| BPDE (diamine) | [g (mmol)] | 10.62 | (26.0) | 10.62 | (26.0) | 10.62 | (26.0) | 20.83 (51.0) |
| BPDA (1st dianhydride) | [g (mmol), %] | 7.21 | (24.5), 98 | 6.99 | (23.75), 95 | 6.84 | (23.5) 93 | 11.77 (40) 80 |
| ODPA (2nd dianhydride) | [g (mmol) %] | 0.16 | (0.50), 2 | 0.39 | (1.25) 5 | 0.54 | (1.75) 7 | 3.10 (10) 20 |
| PA | [g (mmol)] | 0.30 | (2.0) | 0.30 | (2.0) | 0.30 | (2.0) | 0.3 (2.0) |
| DMAPy | [g (mmol)] | 0.10 | (0.80) | 0.10 | (0.80) | 0.10 | (0.80) | 0 |
| NMP | [ml] | 125 | | 125 | | 125 | | 100 |
| Mesitylene | [ml] | 150 | | 150 | | 150 | | 250 |
| Properties | | | | | | | | |
| Yield | [g (% of theory)] | 13 | (38.8) | 14.9 | (44.5) | 14.3 | (42.7) | 31.2 (93.2) |
| $\eta_{red}$ | (ml/g) | 82 | | 49 | | 46 | | 55 |
| $T_{m1}$ | [°C.] | 343 | | 342 | | 342 | | 338 (352)* |
| $T_{m2}$ | [°C.] | 380 | | 331 | | 322 | | 289 |
| $T_{g2}$ | [°C.] | 219 | | 213 | | 217 | | 226 |

$T_{m1}$: melting point, determined by DSC measurement of the maximum of the melt endotherms during the first heating
$T_{m2}$: melting point, determined by DSC measurement of the maximum of the melt endotherms during the second heating
$T_{g2}$: glass transition, determined by DSC measurement during the second heating
*two maxima were observed

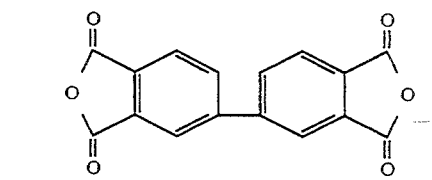

and $a_2$) 2 to 35 mol % of oxydiphthalic dianhydride of the structure

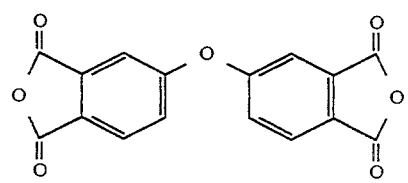

and in addition $a_3$) 0 to 30 mol % of one or more aromatic dianhydrides different from ($a_1$) and ($a_2$), with B) a diamine component consisting essentially of
  b₁) 65 to 100 mol % of a diamine of the formula

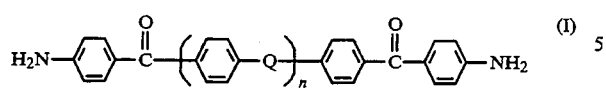 (I)

where
  n may be 1 or 2 and
  Q is —O—, —S—, —SO—, —C(CH₃)₂—, —C(CF₃)₂— or —CH₂ and in addition
  b₂) 0 to 35 mol % of one or more aromatic diamines different from (b₁).

2. A polyimide as defined in claim 1, in which the dianhydrides (a₃) have the formula

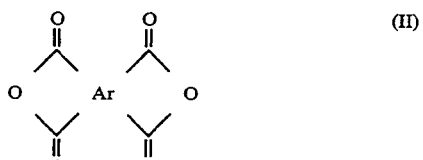 (II)

where Ar is

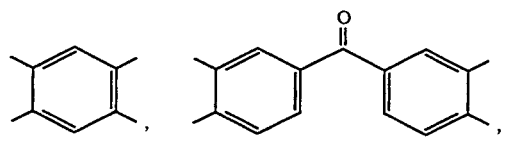,

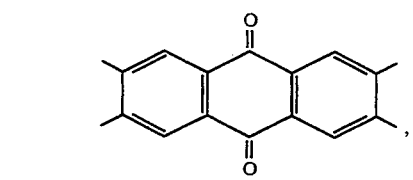,

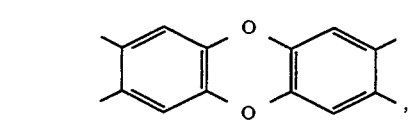,

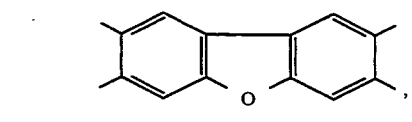,

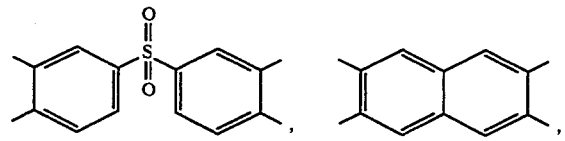,

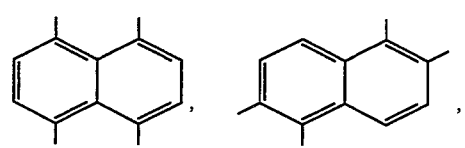,

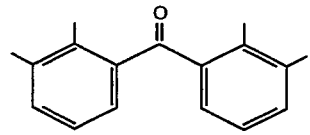 or

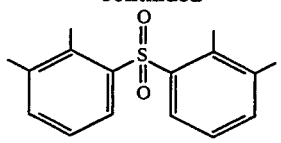

3. A polyimide as defined in claim 1, in which the component (a₃) is a dianhydride selected from the group

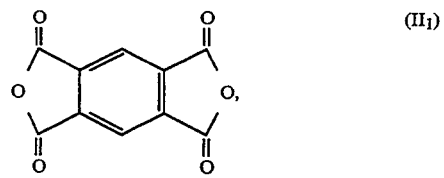 (II₁)

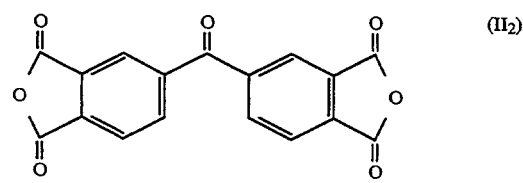 (II₂)

and

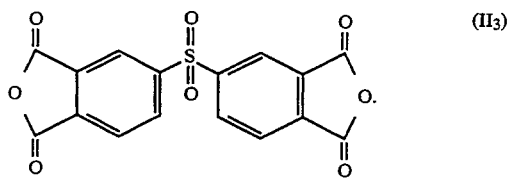 (II₃)

4. A polyimide as defined in claim 1, in which the diamines (b₂) have the formula

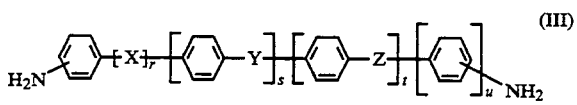 (III)

where
  r, s, t and u are, independently of one another, 0 or 1, and
  X, Y and Z are, independently of one another, —O—, —CO—, —S—, —SO₂—, —CH₂—, —C(CH₃)₂—, —C(CF₃)₂— or a direct bond.

5. A polyimide as defined in claim 1, in which the component (b₂) is a diamine selected from the group consisting of

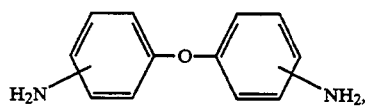,

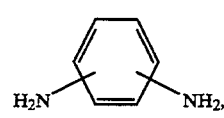,

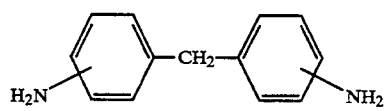

and

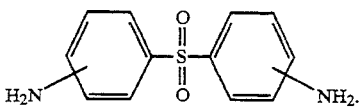

6. A polyimide as defined in claim 2, obtained by reacting
A) a dianhydride component comprising
  a₁) 75 to 98 mol % of 3,4,3',4'-biphenyltetracarboxylic dianhydride,
  a₂) 2 to 25 mol % of 4,4'-oxydiphthalic dianhydride and
  a₃) 0 to 15 mol % of dianhydrides of the formula (II) with B) a diamine component comprising
  b₁) 80 to 100 mol % of diamines of the formula (I) and
  b₂) 0 to 20 mol % of diamines of the formula (III)

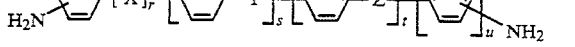

where
r, s, t and u are, independently of one another, 0 or 1, and
X, Y and Z are, independently of one another, —O—, —CO—, —S—, —SO₂—, —CH₂—, —C(CH₃)₂—, —C(CF₃)₂— or a direct bond.

* * * * *